S. R. TEMPLE.
TRUCK.
APPLICATION FILED JUNE 16, 1909.
940,565.
Patented Nov. 16, 1909.
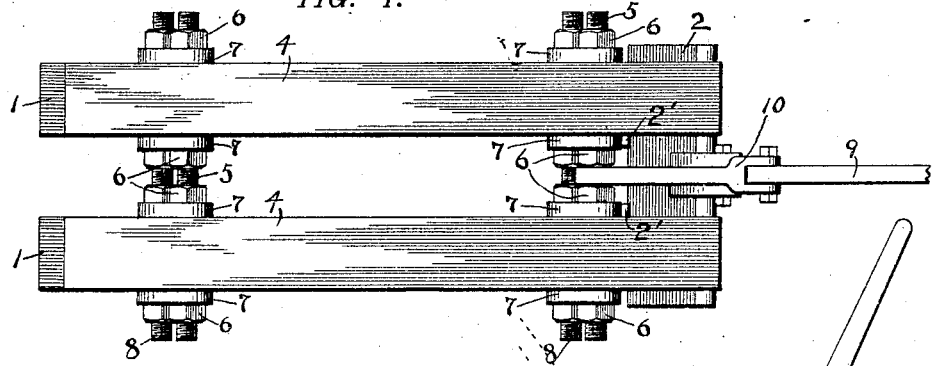
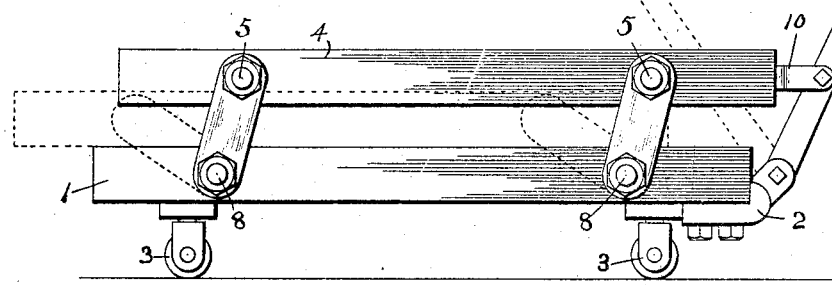
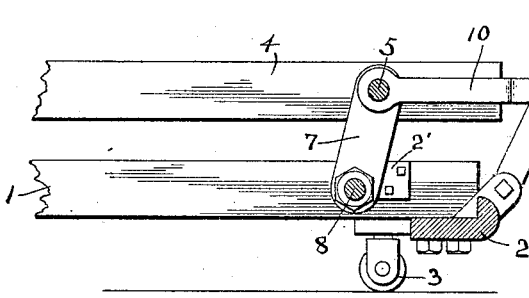 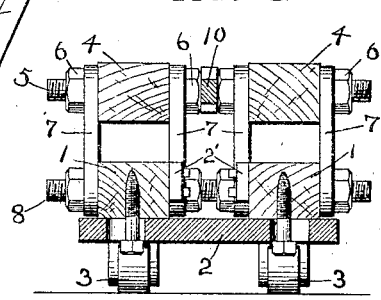
WITNESSES
M. E. Payne
A. A. Hammond
INVENTOR
Sidney R. Temple
Vernon E. Hodges
Attorney

UNITED STATES PATENT OFFICE.

SIDNEY R. TEMPLE, OF CINCINNATUS, NEW YORK.

TRUCK.

940,565.  Specification of Letters Patent.  Patented Nov. 16, 1909.

Application filed June 16, 1909. Serial No. 502,488.

*To all whom it may concern:*

Be it known that I, SIDNEY R. TEMPLE, a citizen of the United States, residing at Cincinnatus, in the county of Cortland and State of New York, have invented certain new and useful Improvements in Trucks, of which the following is a specification.

My invention relates to an improvement in trucks, for lifting and moving stoves, boxes, or other heavy articles, the object being to provide an easily controlled self-locking truck which may be moved with facility and comparative ease in various directions, whereby to slide and take under any heavy article standing on short legs—such as a stove, articles of furniture or other heavy objects, even heavy trunks, or boxes, or crates, when tilted for the purpose.

With these objects in view, this invention comprises two frames, one at least of which is laterally adjustable to increase or decrease its width, and means for pivotally connecting the two whereby one may be raised or lowered when desired, and when raised, will remain locked in that position by the very act of raising it.

In the accompanying drawings:—Figure 1 is a plan view, Fig. 2 is a side elevation, the dotted lines indicating the position when the upper frame is lowered, Fig. 3 is a transverse section, and Fig. 4 is a fragmentary view in longitudinal section of the forward end of the truck.

The base frame comprises the two longitudinal bars 1, 1, held apart at one end by a spacing block 2. This is mounted on caster wheels 3, 3, of which four are shown.

The upper frame comprises two longitudinal bars 4, 4, which are adjustably held apart by means of bolts 5, 5, and nuts 6, 6, on the threads thereof, which may be turned to laterally adjust these bars. The links 7, 7, extend from these bolts to the corresponding bolts 8, 8, which connect the bars 1, 1, of the lower frame. A hand lever 9 is pivotally connected with the forward end of the block 2, and a connecting bar 10 extends therefrom to the forward bolt 5 of the upper frame. By manipulating this lever, the upper frame is raised or lowered. It is simply necessary to swing it a short distance to effect this raising or lowering of the upper frame as indicated in Fig. 2 in the full and dotted lines. That is to say, when moved inwardly, the truck is collapsed, and when moved outwardly, it is raised where it is held by the weight of the article supported thereon, and being moved by the central links 7, 7, engaging and resting upon the blocks 2', 2', after the links have passed their dead centers in the raising of the upper frame.

Thus, I have produced a truck which is easily handled by one hand, both in moving it about from place to place, and also in raising or lowering it to be moved, and furthermore, it will be understood that it is not only adjustable as to size, but also it remains locked in elevated position, when the lever is swung outwardly, as hereinbefore fully explained.

Having fully described my invention, what I claim as new and desire to secure by Letters Patent, is:—

1. A truck comprising an upper and lower frame, a hand lever connecting the two, means pivotally connecting the two frames together, a rigid block carried by one of said frames in position to be directly engaged by the connecting means when the upper frame is raised, whereby to hold the latter locked in said raised position.

2. A truck comprising two frames, the upper of which is adjustable as to width, means for pivotally connecting the two frames, and means for raising and lowering the upper frame and automatically locking it in its raised position.

3. A truck comprising two frames mounted on caster wheels, a hand lever connecting the two, links connecting said frames, threaded bolts connecting the members composing the frames, and nuts on the bolts for adjusting the width of the frame or frames.

4. A truck comprising upper and lower frames, the frames each composed of two parallel bars, spacing blocks between the forward ends of the bars of the lower frame, bolts connecting the bars forming each frame, links extending from the upper to the lower bolts, abutments for the forward links whereby to lock the upper frame in its elevated position when elevated, and a lever connected with the two frames for raising and lowering the upper frame, and for moving the truck into position.

In testimony whereof I affix my signature, in the presence of two witnesses.

SIDNEY R. TEMPLE.

Witnesses:
  E. L. DWIGHT,
  E. L. TOTMAN.